3,579,366
Patented May 18, 1971

3,579,366
GRANULATED ADDITIVE, METHOD OF MAKING THE SAME, AND CEMENTITIOUS GROUT AND CONCRETE COMPOSITIONS CONTAINING THE SAME

Solomon J. Rehmar, East Cleveland, Ohio, assignor to Intrusion-Prepakt, Cleveland, Ohio
No Drawing. Filed July 12, 1968, Ser. No. 744,303
Int. Cl. C04b 21/02, 31/40
U.S. Cl. 106—314                                    6 Claims

ABSTRACT OF THE DISCLOSURE

As an additive for cementitious grout and concrete, a porous granule characterized by a skeletal structure and a network of interstitial voids formed by in situ gas liberation, the skeletal structure consisting essentially of a dispersion of finely divided, substantially oxide free aluminum particles in a matrix formed of a powdered inorganic extender and a water soluble binder which is inert with respect to the aluminum particles.

---

This invention relates to the art of cementitious grout and concrete compositions, and more particularly to an improved granular additive therefor, a method of making the additive, and cementitious grout and concrete compositions containing the same.

The principal function of the granulated additive of the present invention is to counteract setting shrinkage of confined bodies of cementitious grout and concrete compositions. "Setting" is the term usually used to describe the change of a grout or mortar from a fluid or plastic state to a rigid state.

The granulated additive of the present invention contains a dispersion of finely divided substantially oxide free aluminum particles. When the oxide free surface of aluminum is exposed to the highly alkaline environment of curing cementitious grout or concrete, the aluminum undergoes an oxidation reaction, resulting in the liberation of hydrogen gas. Since the gas is generated from within the confined body of cementitious grout or concrete, the attendant gas pressure tends to force the cementitious composition into full occupancy of the volume confining it.

The generation of gas within a grout or concrete provides an additional benefit. It acts in opposition to the normal tendency of sand and cement to settle. Thus bleeding (collection of separated water at surface of grout or concrete) is reduced to a minimum.

Heretofore, as described is my U.S. Pat. 3,197,323, issued July 27, 1965, shrinkage during setting of cementitious grout and concrete compositions has been controlled by the addition thereto of granules or pellets containing a dispersion of oxide free particles of aluminum, a powdered extender, and a water soluble binder material. These granules constituted a substantial improvement in the prior art then known, since they provided the oxide free aluminum particles with satisfactory protection against oxidation, both during storage and during dry blending of the granules with the cementitious grout and concrete compositions.

Thus the structural integrity of the granules or pellets, as well as the protective coating provided the oxide free particles of aluminum, remained unimpaired until exposed to the highly alkaline environment present during curing of the cementitious composition. In the presence of high alkalinity, the granules as well as the protective coating from the aluminum particles disintegrated, exposing the oxide free aluminum surfaces to oxidation and resulting in the release of hydrogen gas.

In accordance with the teachings of my prior patent, the extender served the purpose of providing porosity in the granules and prevented the binder materials from forming too impervious a coating around each aluminum flake.

I have found that granules formed in accordance with the teachings of my earlier patent produce very satisfactory results, provided that care is exercised in controlling, within narrow limits, the degree of compaction which is employed in forming the granules as well as controlling their size. If these controls are not maintained, the following problems may arise:

(a) If the granules disintegrate, by abrasion, during dry blending, the gas generation may be completed before grout or concrete is in place. In such a case, much of the expanding action may be lost.

(b) If the granules are too dense, the gas generation may be too slow. In such a case there will be a decreased effect on the reduction in bleeding.

Since it is not always possible to maintain a level of quality control which will ensure a proper degree of compaction during granule formation, there is a need for an improved granule of the type described in my earlier issued patent, which is less sensitive to variables in the manufacturing operations, such as the degree of compaction and size of granules formed. The present invention is addressed to filling this need.

In accordance with one aspect of the present invention there is provided as an additive for cementitious grout and concrete, a porous granule characterized by a skeletal structure and a network of interstitial voids formed by in situ gas liberation, the skeletal structure consisting essentially of a dispersion of finely divided, substantially oxide free aluminum particles in a matrix formed of a powdered inorganic extender and a water soluble binder therefor, the binder being inert with respect to the aluminum particles.

In accordance with another aspect of the present invention, there is provided in a method of manufacturing granules useful as an additive for cementitious grout and concrete, comprising the steps of admixing finely divided, substantially oxide free particles of aluminum, a powdered inorganic extender and a water soluble binder which is inert with respect to the aluminum particles, in the presence of sufficient water to produce a paste; forming the resulting admixture into granules; and drying the granules at an elevated temperature: the improvement comprising the step of incorporating in the admixture, prior to the heating step, a blowing agent operative to cause in situ gas liberation during the drying step, thereby producing dried, porous granules characterized by skeletal structure and a network of interstitial voids.

In accordance with a further aspect of the present invention there is provided a dry mixture of cementitious hydratable grout or concrete, and porous granules of the type defined above, the granules being present in an amount providing a quantity of metallic aluminum required to react with alkali in the grout or concrete, and produce hydrogen gas in a volume sufficient to control expansion and bleeding of the grout or concrete.

Thus, the granules of the present invention are improved by virtue of their embodying a skeletal structure and a network of interstitial voids formed by in situ gas liberation. And since gas liberation takes place during the drying of the granules, and following any compaction thereof, the rate at which the granules disintegrate and the aluminum content thereof reacts with alkali, are less sensitive to the degree of compaction and the size of granules produced during granulation. Consequently, the improved granules can be expected to perform well, although manufactured, under less stringent quality control measures than are required for the manufacture of prior art granules from which the blowing agent has been omitted.

It is therefore an object of the present invention to provide an improved porous granule containing substantially oxide free aluminum particles, for use as an additive for cementitious grout and concrete.

Another object of the present invention is to provide an improved method for manufacturing granules of the character described above.

Still a further object of the invention is to provide improved cementitious, hydratable grout or concrete compositions containing porous granules of the character described above.

These and other objects and advantages will become apparent from the following detailed description of the invention including a working example responding to the best mode presently contemplated for carrying out the invention.

Porous granules produced in accordance with the practice of the present invention consist of three essential ingredients. These are substantially oxide free particles of aluminum, a powdered inorganic extender, and a water soluble binder.

Any source of finely divided oxide free aluminum particles may be used in the practice of the present invention. One convenient, commercially available, form is a standard 100 mesh varnish leafing aluminum powder, which is used primarily in paints and other coatings where a lustrous aluminum finish is desired. These aluminum particles are produced by a peening operation in the presence of oil. In this manner, as a fresh oxide free surface of aluminum is developed, it is immediately protected against oxidation by a thin but tenacious film of oil. Sufficient aluminum particles should be included in the admixture to provide from about 7 to about 12 weight percent of the dried skeletal structure of the granule.

A variety of materials may be used as the powdered inorganic extender, so long as these materials are not reactive with oxide free aluminum. Useful materials include limestone, aluminum oxide, clays, such as kaolin and bentonite, carbon, such as coal dust, and mixtures of the foregoing. The powdered inorganic extender should be present in the admixture in an amount which will provide from about 86 to about 91 weight percent of the skeletal structure of the dried granule.

A number of materials will satisfy the requirements of a useful water soluble binder. All of these materials are readily soluble in water, nonreactive with oxide free aluminum, and resistant to decomposition at elevated temperatures as high as about 350° F., which is about as high a temperature as is needed to dry the granules. Preferred water soluble binders are film forming water soluble cellulose ethers, such as methyl cellulose, ethyl cellulose, and carboxy methyl cellulose. Other useful water soluble binders include polymers of ethylene oxide, carboxy vinyl polymers, and polyethylene glycols. Sufficient water soluble binders should be incorporated in the admixture, to provide a dried residue amounting to from about 3 to about 5 weight percent of the skeletal structure of the finished granule.

The three essential ingredients forming the skeletal structure of the granule, may be admixed on a dry basis, with the subsequent addition of sufficient water to form a paste, but if desired, the water required to produce a paste may be introduced as an aqueous solution of the water soluble binder.

Mixing is accomplished under conditions which induce a minimum amount of abrasive grinding, so as to avoid rupturing of the oil film present on the aluminum particles. This can be carried out in a paddle mixer, and mixing should be discontinued as soon as the ingredients give the appearance of being homogeneously dispersed.

The blowing agent may be incorporated in the admixture at this point, or after granulation or pelletization of the admixture, depending on the mechanism used to effect in situ gas generation.

In accordance with one practice, the blowing agent may comprise at least one compound decomposable into at least one gaseous decomposition product at the elevated temperature employed in the drying step. Examples of suitable compounds of this type include ammonium carbonate, ammonium bicarbonate, and urea. These compounds have the advantage of decomposing entirely into gaseous products, so that no residue is left within the granule composition. These materials may be added to the admixture at any time prior to granulation or pelletization.

In accordance with another mechanism the blowing agent may take the form of a mixture of compounds, one selected from the group consisting of the alkali metal bicarbonates, and the other from the group consisting of citric and tartaric acids. Since mixtures of these compounds begin to react almost immediately, they should be added just prior to granulation or pelletization, so that most of the decomposition into gases will take place during the heating step.

In accordance with yet another mechanism, the blowing agent may take the form of a gas which is partially soluble in water, such as carbon dioxide. Here, the blowing agent, preferably in combination with water vapor, should be added under superatmospheric pressure to the admixture following granulation or pelletization, but prior to the drying step. The elevated temperature employed during the drying step will cause the gas to disassociate itself from the water, and form interstitial voids upon expulsion from the granules or pellets. Other blowing agents and mechanisms will readily occur to those having ordinary skill in the art.

As a final step in the method of prepartion of the cementitious grout and concrete additive of the present invention, the granules or pellets are dried at an elevated temperature, generally within the range of about 125 to about 350° F., until dry. The temperature employed will depend on the blowing agent used and the amount of heat it requires before the gas liberating mechanism is triggered. During the drying step, the blowing agent liberates gas in situ, forming a porous granule or pellet characterized by a skeletal structure and a network of interstitial voids.

It will be appreciated that the volume of voids developed in the granules or pellets of the present invention is substantially greater than pores developed by solvent evaporation in accordance with prior art practices. Thus, the interstitial voids in the granules of the present invention may account for from about 55 to about 65% of the geometric volume of the porous granules. By experiment this is an increase of about 20% compared with the pore volume of granules produced in accordance with my previously patented invention.

The significance of this difference is that the increased void volume permits much faster water ingress. Thus the improved granules disintegrate after about two minutes exposure to water as compared with about fifteen minutes for the prior art granules.

EXAMPLE

The following ingredients were admixed with gentle blending until the admixture presented a homogeneous appearance:

| | Pounds |
|---|---|
| Aluminum flakes (standard varnish leafing 100 mesh powder) | 45 |
| Limestone dust, 100 mesh | 300 |
| Hydrated aluminum oxide | 90 |
| Methyl cellulose | 20 |
| Ammonium carbonate | 3.5 |
| Water | 175 |

When the mixing was stopped, the admixture had a pasty consistency, which was then molded into pellets.

The pellets were baked at a temperature within the range of about 300 to about 350° F., whereby the water was driven off, and the ammonium carbonate decomposed with generation of carbon dioxide and ammonia gases.

The resulting pellets were sufficiently strong to resist damage by abrasion when incorporated with the dry ingredients to a cementitious grout. Upon addition of water to the mixture of pellets and cementitious grout, the water soluble binder dissolved readily and the high alkalinity of the environment, rapidly attacked the oil film on the aluminum particles, permitting the aluminum to oxidize with the evolution of hydrogen gas.

The concentration of pellets in a cementitious hydratable grout or concrete, can be varied over wide limits, and will depend upon the amount of desired expansion or gas entrainment of the grout or concrete. In general, however, the granules or pellets should be present in an amount providing the quantity of metallic aluminum required to react with alkali in the grout or concrete, and produce hydrogen gas in a volume sufficient to control expansion and bleeding of the grout or concrete.

Granules or pellets produced in accordance with the present invention may be stored in a relatively dry place almost indefinitely without degradation. Similarly, admixtures of the granules or pellets and a cementitious hydratable grout or concrete, can be stored for extended periods of time, if kept essentially dry.

The present invention has been described in conjunction with certain specific embodiments. It will be appreciated, that modifications may be made in the illustrated embodiments without departing from the intended scope and spirit of the present invention as defined in the appended claims.

Having thus described my invention, I claim.

1. In a method of manufacturing granules useful as an additive for cementitious grout and concrete which are alkaline during setting, comprising the steps of admixing finely divided, substantially oxide free particles of aluminum, a powdered inorganic extender and a water soluble binder which is inert with respect to said aluminum particles, in the presence of sufficient water to produce a paste; forming the resulting admixture into granules; and drying said granules at an elevated temperature: the improvement comprising the step of incorporating in said admixture prior to said heating step a blowing agent operative to cause in situ gas liberation during said drying step, thereby producing dried, porous granules characterized by a skeletal structure and a network of interstitial voids.

2. The method as defined in claim 1 wherein said blowing agent is added to said admixture prior the formation of granules therefrom, and comprises at least one compound decomposable into at least one gaseous decomposition product at the elevated temperature employed in said drying step.

3. The method as defined in claim 1 wherein said blowing agent is added to said admixture under superatmosphere pressure after formation of granules therefrom, and prior to said drying step and comprises a gas which is partially soluble in water.

4. The method as defined in claim 2 wherein said blowing agent is selected from the group consisting of ammonium carbonate, ammonium bicarbonate, and urea.

5. The method as defined in claim 2 wherein said blowing agent is a mixture containing a compound selected from the group consisting of the alkali metal bicarbonates and a compound selected from the group consisting of citric and tartaric acids.

6. The method as defined in claim 3 wherein said gas is carbon dioxide.

References Cited
UNITED STATES PATENTS

| | | | |
|---|---|---|---|
| 3,197,323 | 7/1965 | Rehmar | 106—314 |
| 2,978,340 | 4/1961 | Veatch et al. | 106—40 |
| 2,530,217 | 11/1950 | Bain | 106—193 |
| 2,280,135 | 4/1942 | Ward | 106—193 |

TOBIAS E. LEVOW, Primary Examiner

W. T. SCOTT, Assistant Examiner

U.S. Cl. X.R.

106—86, 87